United States Patent [19]

Burgdorf et al.

[11] Patent Number: 5,186,524
[45] Date of Patent: Feb. 16, 1993

[54] HYDRAULIC BRAKE SYSTEM

[75] Inventors: Jochen Burgdorf, Offenbach-Rumpenheim; Gerd Klostermann, Friedrichsdorf; Nabil Henein, Darmstadt, all of Fed. Rep. of Germany

[73] Assignee: Alfred Teves GmbH, Frankfurt am Main, Fed. Rep. of Germany

[21] Appl. No.: 913,156

[22] Filed: Jul. 14, 1992

Related U.S. Application Data

[62] Division of Ser. No. 510,323, Apr. 16, 1990.

[30] Foreign Application Priority Data

Apr. 14, 1989 [DE] Fed. Rep. of Germany ....... 3912234

[51] Int. Cl.$^5$ .......................... B60T 8/32; B60T 11/16; B60T 13/12
[52] U.S. Cl. ........................................ 303/92; 303/10; 303/113.2; 303/113.4; 303/116.1; 303/119.1
[58] Field of Search ............. 303/92, 113 SS, 113 TR, 303/113 R, 113 TB, 114 R, 114 PN, 10-12, 116 R, 116 SP, 119 R, 100, 110, 93, DIG. 3, DIG. 4; 188/356, 357

[56] References Cited

U.S. PATENT DOCUMENTS

| 4,807,944 | 2/1989 | Weise | 303/10 X |
| 4,826,255 | 5/1989 | Volz | 303/113 SS |
| 4,840,436 | 6/1989 | Burgdorf et al. | 303/119 R |
| 4,919,496 | 4/1990 | Burgdorf et al. | 303/113 SS |
| 5,013,096 | 5/1991 | Ocvirk et al. | 303/116 R |
| 5,044,702 | 9/1991 | Beck et al. | 303/100 |
| 5,100,210 | 3/1992 | Buschmann | 303/113 SS |

FOREIGN PATENT DOCUMENTS

| 3808523 | 9/1989 | Fed. Rep. of Germany . |
| 1490285 | 10/1977 | United Kingdom . |
| 2188994 | 10/1987 | United Kingdom . |

*Primary Examiner*—Douglas C. Butler
*Attorney, Agent, or Firm*—Robert P. Seitter; J. Gordon Lewis

[57] ABSTRACT

The proposed brake system eliminates breather bores and central valves in the working pistons of the master brake cylinder and establishes short-term pressure fluid connections between the supply reservoir and the working chambers when the brake is not applied by controlling replenishment valves and outlet valves. Therefore, connection of the supply reservoir to the working chambers of the working cylinder is constituted solely via electromagnetically controllable connections.

8 Claims, 3 Drawing Sheets

HYDRAULIC BRAKE SYSTEM

This application is a division of application Ser. No. 07/510,323, filed Apr. 16, 1990.

BACKGROUND OF THE INVENTION

The present invention relates to a hydraulic brake system for brake slip control and/or traction slip control having a pedal-operated master brake cylinder and wheel brake cylinders, a pressure fluid supply reservoir, a pressure fluid conduit between the working chambers of the master brake cylinder and the pressure fluid supply reservoir and at least one electromagnetically actuated value.

A hydraulic brake system is usually composed of a master brake cylinder and wheel brake cylinders connected thereto. The cylinders and the brake lines are filled with brake fluid. When the master brake cylinder is not actuated, it is arranged to connect the brake circuits to a supply reservoir for the following reasons.

On the one hand, provisions must be made so that the brake circuits are always filled completely with pressure fluid, since otherwise air bubbles will be caused in the brake circuits on operation of the brake system, which air bubbles due to their compressibility prevent a direct transmission of the pedal force onto the wheel brakes. On the other hand, heat expansion of the brake fluid must be taken into account. If the brake systems were closed-loop systems, the expansion of the brake fluid would result in force being applied on the wheel brakes, whereby the vehicle is decelerated in an undesirable way.

Currently, two methods have been devised in order to realize the connection of the brake circuits to the supply reservoir when the brake is not operated. The most simple solution resides in filling the brake system through a so-called breather bore (i.e., a transverse bore in the master brake cylinder housing) which is in communication with the supply reservoir and terminates directly in front of the working pistons of the master brake cylinder into the working chamber of the master brake cylinder. Upon operation of the brake, the working pistons displace and, in doing so, override their respectively assigned breather bore, resulting in a closed brake-circuit system on brake actuation. When the driver removes his foot from the pedal, the working pistons are reset by resetting springs into their initial position so that the connection between the working chamber and the supply reservoir is re-established via the breather bore. As long as a similar brake system is not used for controlling the brake slip, refilling of the brake circuits by way of breather bores entails no problems at all.

In anti-lock hydraulic brake systems, pressure fluid, out of an auxiliary-energy source, is introduced into the brake circuits for regulating the wheel braking pressure. As a consequence, a residual pressure is prevailing in the brake circuits and thus in the master brake cylinder when the working pistons of the master brake cylinder release the breather bores. The sealing cups of the working pistons are pressed into the breather bores by the pressure in the brake circuits and thereby destroyed. Therefore, it has been proposed to replace the breather bores by so-called central valves in anti-lock hydraulic brake systems. These valves are arranged in the working pistons of the master cylinder and normally consist of a valve ball which, in the initial position of the working pistons, is kept at a distance from the valve seat by way of a tappet abutting on a pin formed fast with the housing. When the brake is applied, and displacement of the working pistons occurs, the valve balls can move to sit on their valve seat, the brake circuits being hydraulically isolated as a result. Though this measure seems to be quite simple, considerable problems are encountered in practice. In addition, the central valves are more expensive than the construction of the breather bores, and assembly is difficult.

Moreover, both methods result in a considerably longer master brake cylinder size, since the working pistons must have at least once more the length of the working chambers.

Another disadvantage resides in that both systems have lost travel due to their construction. Before it is possible to build up pressure in the master brake cylinder, the breather bores must first be overridden, or the central valves must be closed, respectively. This lost travel implies during a braking operation that no braking effect is accomplished in the first phase of the pedal depression.

Furthermore, the working pistons must be adjusted precisely when the master brake cylinder is fitted in order to minimize the lost travel. The situation becomes particularly complicated when the master brake cylinder is operated by a booster. The booster piston, too, must be precisely adjusted so that the initial positions of the working piston and the booster piston are accurately conformed to each other.

SUMMARY OF THE INVENTION

Therefore, this invention has for its object to devise a straightforward re-fill system which, in addition thereto, permits simplifying the mode of construction of the master brake cylinders. In addition to this, the master brake cylinder shall have an overall size as short as possible and lend itself to ease of assembly.

This object is achieved by providing a sensor for indicating pedal actuation and, when the pedal is in a nonapplied position, switching an electromagnetically operated valve means into an open position at least temporarily.

The idea at issue can be characterized as follows. While in the known state of the art the hydraulic system is an open system in the absence of any brake actuation and is not closed until actuation of the master brake cylinder, the present invention discloses a system which is normally closed even when the brake is not applied. Hence the abovementioned drawbacks do not exist. For instance, the system does not have any lost travel. There is merely an electromagnetically controllable pressure fluid conduit which is opened for a short time when precisely defined criteria apply. It may, for example, be provided that the pressure fluid conduit is opened after every braking operation in order to decrease the pedal pressure in the system. Furthermore, the inventive system affords the advantage that the brake system, which is usually closed, can be monitored for leakage more easily.

The pressure fluid conduit with the solenoid valve can terminate in a favorable manner into the master-cylinder working chamber at a certain distance from the initial position of the working piston. This eliminates adaptation problems with the pedal assembly and with any booster that may be inserted in front of the master cylinder. The pedal assembly and booster include stops which define the initial positions of the pedal and the booster pistons. The latter positions have to conform to the basic position of the working pistons so that the breather bore terminates into the working chamber or the central valve is opened, respectively, when the pedal is not depressed. These problems do not exist in the inventive system.

In principle, it is possible to employ the inventive arrangement in conventional brake systems without slip control. The additional cost for the solenoid valves needs to be contrasted with the cost for a central valve or a breather bore, respectively.

Therefore, the present invention permits expedient use in slip-controlled brake systems, since these systems already include solenoid valves which, by virtue of a changed actuation, can be used for the replenishment of the brake circuits with pressure fluid.

A brake system is known from German published patent application 36 35 846, wherein the working chamber of the master brake cylinder communicates with the supply reservoir via a central valve. One solenoid valve, which is open in its de-energized state, is inserted into the connecting line between each working chamber of the master brake cylinder and the supply reservoir, namely between the supply reservoir and the central valve To control traction slip, pressure fluid is supplied into the brake lines by way of a pump so that pressure can be built up in the wheel brakes irrespective of pedal depression. However, return flow of fluid to the supply reservoir must be prevented. This is achieved by closing the solenoid valves between the supply reservoir and the central valves during a traction slip control operation.

When employing the inventive idea and further developing the brake system disclosed in the last-mentioned published patent application, the solenoid valves can be used as replenishment valves. These valves are closed as long as the magnet coils are de-energized. Therefore, the brake circuits are normally shut off hydraulically, thereby allowing pressure to develop on brake application. The valves will then be opened for a short time according to predetermined criteria so that pressure is not allowed to develop in the brake circuits when the pedal is not applied.

In the event of the brake system having this form, the pressure fluid conduit between the master brake cylinder and the supply reservoir can be a housing bore in the master cylinder housing. The pump line for replenishment of pressure fluid during a slip control operation terminates into this housing bore.

It is also possible to use the valve that is closed in its de-energized state as a replenishment valve in the connection of the wheel brake to the supply reservoir. The expenditure in valves is thus minimized. The pressure-fluid connection is then established via the brake line and the relief line.

The signal to open the replenishment valve can be generated in various ways. The basic precondition is, in any case, that the pedal is in its initial position. This can be determined easily by means of a pedal switch which is coupled to the pedal. It can be ensured thereby that the replenishment valve is opened for a short time at least at the end of a braking operation.

In addition, the signals of a pressure sensor or a temperature probe can be taken into account as further criteria. When pressure develops in the master brake cylinder when the pedal is not depressed, the replenishment valve will be opened for a short time. Possibly it is even sufficient to open the valve in the event of temperature increase. It is also possible to detect, for example, grinding noises of the pads on the brake disc or on the brake drum and to open the replenishment valve whenever it can be judged from the grinding noises that the brake is applied in an unwanted fashion.

To compensate for pressure fluid losses due to minor leakages, an alarm switch may be arranged which serves to initiate the pump supply when the pedal is depressed beyond a threshold.

Another switch on the pedal is used for controlling the pressure fluid supply of the pump during a slip control action. The pressure fluid supply is influenced in such a fashion that the pedal is moved to assume a predefined position during a control action. The quantity of pressure fluid which is delivered into the brake lines can be influenced by switching on and off the pump drive or by opening the valves in the supply line with short-time pulses.

BRIEF DESCRIPTION OF THE DRAWINGS

The inventive idea shall be explained in more detail by way of two embodiments which are shown in the drawings.

DETAILED DESCRIPTION OF THE PREFERRED EMBODIMENT

Figure 1:
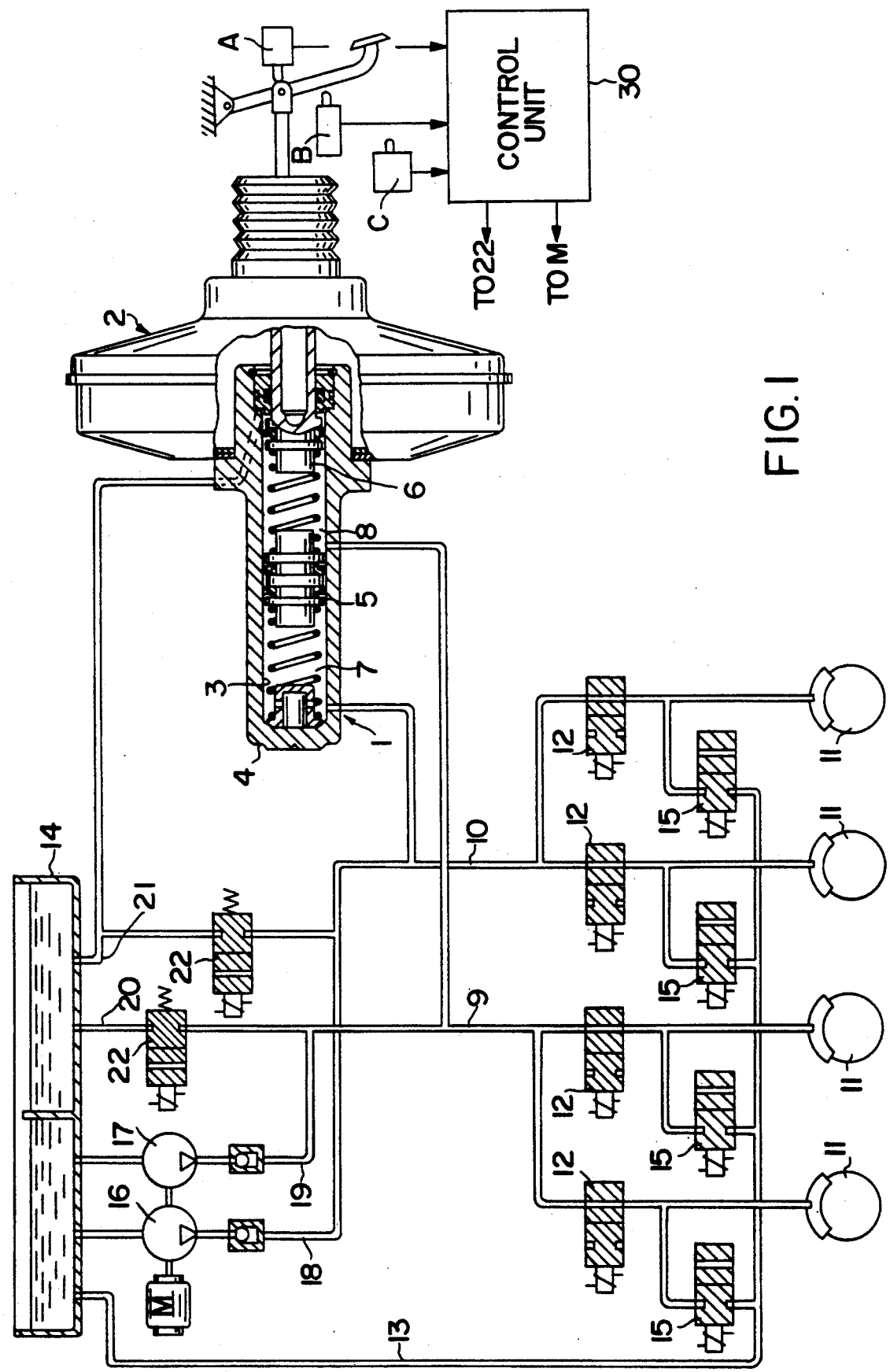
FIG. 1 illustrates, partially in section and partially in schematic circuit diagram form, a first embodiment of a hydraulic brake system constructed in accordance with the present invention.

The brake system is composed of a master brake cylinder 1 and a vacuum booster 2 which is inserted in front of the master brake cylinder. Two working pistons 5 and 6 are sealingly guided in a bore 3 of the master cylinder housing 4. The push rod piston 6 is exposed to the direct action of the boosted pedal force, whereas the floating piston 5 is exposed to the hydraulic pressure in the working chamber 8. By virtue of the pistons 5 and 6, two working chambers 7 and 8 are formed in the master cylinder housing 4. Each working chamber communicates via a respective brake line 9 or 10 with the wheel brakes 11. An inlet valve 12 is inserted into the brake lines 9, 10 and/or into the branch lines to the wheel brakes 11. The inlet valve 12 is controlled electromagnetically, and adopts an open position when the magnet coils are not energized. In other words, the valve is 'open in its de-energized state' or a normally opened valve.

Furthermore, the wheel brakes 11 are in communication with the supply reservoir 14 via a relief line 13. An outlet valve 15 is connected into each branch line of the relief line 13 leading to the wheel brakes 11. The outlet valve 15 is controlled electromagnetically and assumes a closed position when the coils are not energized. Such a valve is referred to as 'closed in its de-energized state' or a normally closed valve.

Figure 3:
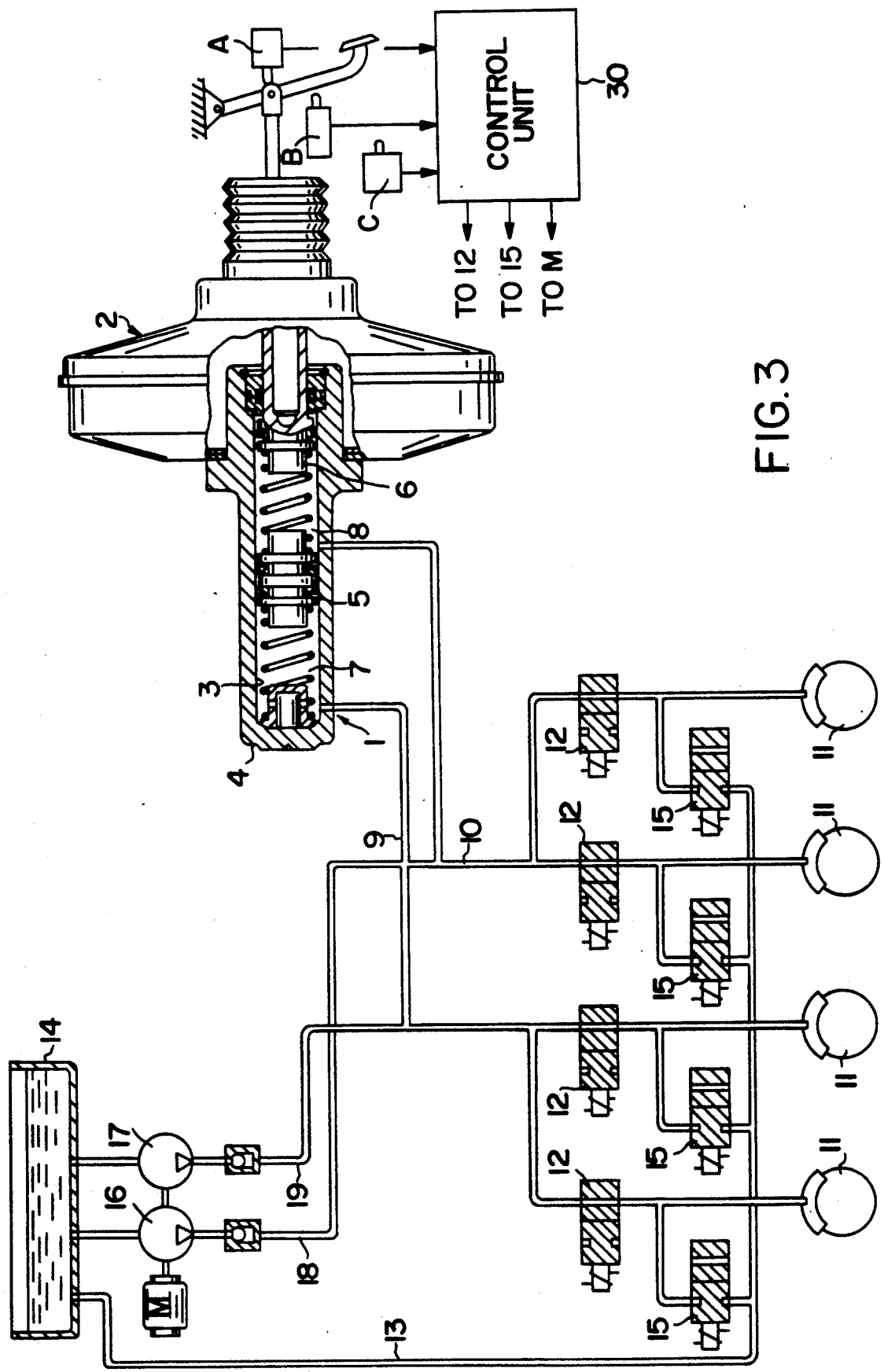
FIG. 3 illustrates, partially in section and partially in schematic circuit diagram form, a second embodiment of a hydraulic brake system constructed in accordance wit the present invention.

The brake system is also furnished with two pumps 16, 17 which are driven by a single electric motor M The pumps supply fluid from the supply reservoir 14 to the working chambers 7 and 8 of the master brake cylinder. According to the embodiment of FIG. 3, the pressure lines 18, 19 of the pumps terminate into the brake lines 9 and 10, or more precisely at a position directly below the master brake cylinder.

According to FIG. 1, there is a direct connection between the working chambers 7, 8 and the supply reservoir 14 via supply lines 20, 21. A replenishment valve 22 is inserted into each of the supply lines 20, 21. These replenishment valves 22 are controlled electromagnetically. As long as the magnet coils are de-energized, the valves are in their closed position. The pressure lines of the pumps 16, 17 terminate into the supply lines 20, 21, namely between the working chamber 7 and/or 8 and the replenishment valve 22.

Figures 2, 2A:
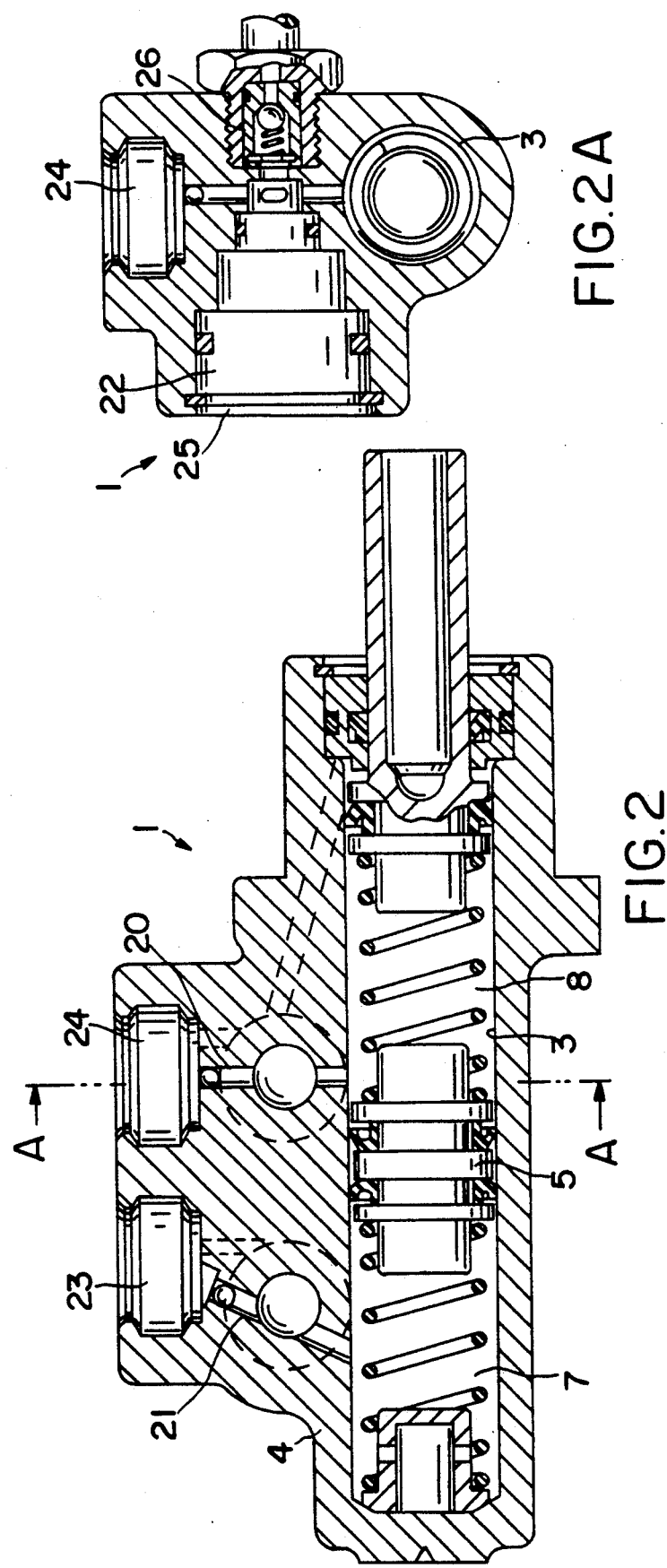
FIG. 2 is a cross-sectional view of one implementation of the FIG. 1 hydraulic brake system.
FIG. 2A is a cross-sectional view taken along lien A—A of FIG. 2.

FIG. 2 shows a cross-sectional view of a possible embodiment of the hydraulic circuit according to FIG. 1. The supply lines 20, 21 are illustrated as channels or housing bores in the master cylinder housing 4 which extend from the working chamber 7, 8 to the connecting sockets 23, 24 for the supply reservoir 14.

A cross-sectional view, taken along line A—A of FIG. 2, is shown in FIG 2A. A receiving bore 25 for a solenoid valve 22 can be seen. The pressure port 26 for the pump is placed on the opposite side. The associated nonreturn valve is integrated in the port 26.

Important safety functions are illustrated by three switches A, B, C which detect the pedal position. These switches are shown symbolically and are actuated directly by the pedal in FIGS. 1 and 3. The switch operation can of course be performed in an equivalent manner by any other part of the system, as long as the equivalent movement is coupled with the pedal position in a definite way. Examples of such equivalent parts are the push rod piston 6 or the movable wall of the booster.

It is the function of switch A to detect whether the pedal is in its initial position Switch B is required to regulate the pump's rate of delivery and to thereby bring about positioning of the pedal. Fluid losses due to leakage are detected by virtue of switch C.

The mode of operation of the brake system is described hereinbelow. The driver operates the brake by depressing the (symbolically illustrated) pedal. In consequence thereof, the push rod piston 6 and, consequently, the floating piston 5 are displaced. Pressure fluid propagates out of the working chambers 7 and 8 to the wheel brakes 11, whereby the brakes are operated and the vehicle is decelerated. Compared to known systems in the art, the present invention has the advantage of providing pressure build-up without lost travel, since the brake circuits are closed hydraulically from the very start. Lost travel occurs in the prior art, because the breather bore must be overridden or the central valve must be closed before the brake circuit is closed hydraulically.

When the sensors monitoring the rotational behavior of the wheels detect an imminent locked condition at any one of the wheels, the system switches into the anti-lock mode. This implies that the pump drive M is switched on, and the pumps deliver fluid into the working chambers. Switching of the inlet and outlet valves allows pressure in the wheel brakes to be decreased or increased depending on the rotational behavior of the corresponding wheel so that locking of the wheel is prevented and, simultaneously, an optimal slip value is adjusted. This is a known method so that no further explanations need be given herein.

The regulation of pump pressure is now performed by means of switch B. Pressure fluid is permanently removed from the working chambers of the master brake cylinder by the brake slip control operation. The result thereof is that the push rod piston 6 is shifted increasingly further into the master cylinder, the pedal following this movement. The pedal depresses through its full travel. When the pedal reaches a position which is characterized by switch B, then pump drive M is switched on by a control unit 30. In general, the flow rate of the pumps is in excess of the pumping quantity discharged per time unit out of the working chambers due to the control operation. This causes resetting of the pistons 5 and 6, so that the pistons slide outwardly with respect to the master brake cylinder. The pedal is reset, whereby switch B reassumes its initial position. The pump drive is switched off. In this way, pressure proportional to pedal force is prevailing in the brake circuits and the pedal is fixed in a specific position which is predefined by switch B. Regulation of the discharge flow of the pump can be attained not only by switching the pump drive on and off, but also by a hydraulic short circuiting of the pump. This is done by virtue of the replenishment valves 22, which cause a short-term coupling of the pump's pressure side with the suction side.

The brake system can also easily be used for traction slip control. In a traction slip control operation, braking pressure is applied to the driven wheels so that excessive drive torque is reduced to such an extent that the remaining torque can be transmitted by friction forces between the tire and the road. Spinning of the wheels in the initial phase of driving is prevented in this way. Pressure fluid must be introduced into the wheel brakes for traction slip control. This pressure fluid is supplied by the pump and delivered into the brake circuits. In the state of the art, there is a pressure fluid connection between the working chambers and the supply reservoir when the pedal is not applied. This connection must be closed first. Since, according to the present invention, the working chambers are shut off hydraulically from the start, this step is unnecessary and an immediate pressurization of the wheel brakes of the driven wheels can be performed.

Since the present invention does not provide for a permanent connection between the supply reservoir and the working chambers of the master brake cylinder when the brake is not applied, a few additional switched are needed. The most important switch is switch A which responds as soon as the pedal is applied.

As soon as a braking operation is completed and switch A is reset, a short-term connection will be established between the working chambers of the master brake cylinder and the supply reservoir 14. It is thereby possible to discharge the residual pressure which is possibly prevailing in the wheel brakes. This is accomplished by energizing for a short time, via control unit 30, either the normally closed valves 22, according to FIG. 1, or the normally closed valves 15, according to FIG. 3. There is a connection via the supply lines 20, 21 in the first-mentioned case, and via the brake lines 9, 10 and the relief line 13 in the second-mentioned case.

Heat expansion of the brake fluid, when the brake is not applied, can be detected either by way of a pressure switch not illustrated or by a temperature probe (also not shown). It would also be possible to detect grinding noises of the brake pads applying due to the heat expansion of the brake fluid. As soon as one of the sensors is activated, there is a short-term operation of the valves 22 and 15, respectively. In this way, it is ensured that the inventive system remains unpressurized as long as the pedal is not applied and a traction slip control action is not to take place.

The permanent pressure fluid connection of the brake system of the art when the brake is not applied is also meant to compensate for pressure fluid losses caused by small leakage. To permit realization of this goal in the inventive system, switch C is provided. The pedal travel will gradually extend when pressure fluid losses are entailed so that switch C responds when a defined pressure fluid loss is reached. When this is the case, control unit 30 causes the pumps to start to operate, and pressure fluid is supplied into the working chambers.

The essential idea of the present invention can be formulated as follows elimination of the breather bores and/or the central valve permits a considerably shorter design of the working pistons of the master brake cylinder so that the master brake cylinder as a whole becomes shorter. A shortened pedal travel is accomplished at the same time, since the lost travel entailed when overriding the breather bores or closing the central valves is avoided. The functions performed by the breather bores and by the central valve can be performed by a pedal-travel monitoring means, and a solenoid valve operated under certain conditions, which is arranged in any one of the connecting lines between the master brake cylinder and the supply reservoir.

What is claimed is:

1. A hydraulic brake system for slip control operations comprising:
   a brake pedal;
   a master brake cylinder having first and second working chambers defined by first and second pistons disposed within said master brake cylinder and movable in response to movement of said brake pedal;
   a plurality of wheel brake cylinders;
   a pressure fluid supply reservoir;
   pump means for supplying fluid under pressure from said pressure fluid supply reservoir;
   first fluid conducting means for conducting fluid between said first and said second working chambers of said master brake cylinder and said plurality of wheel brake cylinders, said first fluid conducting means including first and second fluid lines extending between said first and said second working chambers, respectively, and said plurality of wheel brake cylinders and in open fluid communication with said first and said second working chambers regardless of the positions of said first and said second pistons;
   second fluid conducting means extending between said plurality of wheel brake cylinders and said pressure fluid supply reservoir for conducting fluid between said plurality of wheel brake cylinders and said pressure fluid supply reservoir;
   third fluid conducting means extending between said first and said second working chambers of said master brake cylinder and said pressure fluid supply reservoir for conducting fluid between said working chambers and said pressure fluid supply reservoir;
   first electromagnetic valve means in said first fluid conducting means for regulating fluid flow between said first and said second working chambers of said master brake cylinder and said wheel brake cylinders;
   second electromagnetic valve means in said second fluid conducting means for regulating fluid flow between said wheel brake cylinders and said pressure fluid supply reservoir;
   third electromagnetic valve means in said third fluid conducting means for regulating fluid flow between said first and said second working chambers of said master brake cylinder and said pressure fluid supply reservoir;
   and sensing means responsive to movement of said brake pedal for sensing the position of said brake pedal and for controlling:
   (a) said third electromagnetic valve means to permit fluid flow between said first and said second working chambers of said master brake cylinder and said pressure fluid supply reservoir prior to the application of said brake pedal,
   (b) said first electromagnetic valve means to permit fluid flow between said first and said second working chambers of said master brake cylinder and said wheel brake cylinders when said brake pedal is applied and prior to slip control operation,
   (c) said pump means to regulate the delivery of fluid from said pressure fluid supply reservoir to said first and said second working chambers of said master brake cylinder during slip control operation.

2. A hydraulic brake system according to claim 1 wherein said sensing means include:
   a first switch for sensing the position of said brake pedal prior to movement of said brake pedal to permit fluid flow between said first and said second working chambers of said master brake cylinder and said pressure fluid supply reservoir prior to the application of said brake pedal, and
   (b) a second switch for sensing movement of said brake pedal a prescribed first distance to regulate the delivery of fluid from said pressure fluid supply reservoir to said first and said second working chambers of said master brake cylinder during slip control operation.

3. A hydraulic brake system according to claim 2 wherein said third electromagnetic means are closed during slip operation.

4. A hydraulic brake system according to claim 2 wherein said third fluid conducting means include first and second supply lines branching off from said first and said second working chambers, respectively, of said master brake cylinder to said pressure fluid supply reservoir and said third electromagnetic valve means include first and second electromagnetic valves in said first and said second supply lines, respectively.

5. A hydraulic brake system according to claim 4 wherein said first and said second electromagnetic valves of said third electromagnetic valve means are closed during slip operation.

6. A hydraulic brake system according to claim 5 wherein said first and said second supply lines are bores in the housing of said master brake cylinder.

7. A hydraulic brake system for slip control operations comprising:
   a brake pedal;
   a master brake cylinder having first and second working chambers defined by first and second pistons disposed within said master brake cylinder and movable in response to movement of said brake pedal;
   a plurality of wheel brake cylinders;
   a pressure fluid supply reservoir;

pump means for supplying fluid under pressure from said pressure fluid supply reservoir;

first fluid conducting means for conducting fluid between said first and said second working chambers of said master brake cylinder and said plurality of wheel brake cylinders, said first fluid conducting means including first and second fluid liens extending between said first and said second working chambers, respectively, and said plurality of wheel brake cylinders and in open fluid communication with said first and said second working chambers regardless of the positions of said first and said second pistons;

second fluid conducting means extending between said plurality of wheel brake cylinders and said pressure fluid supply reservoir for conducting fluid between said plurality of wheel brake cylinders and said pressure fluid supply reservoir;

third fluid conducting means extending between said first and said second working chambers of said master brake cylinder and said pressure fluid supply reservoir for conducting fluid between said working chambers and said pressure fluid supply reservoir;

first electromagnetic valve means in said first fluid conducting means for regulating fluid flow between said first and said second working chambers of said master brake cylinder and said wheel brake cylinders;

second electromagnetic valve means in said second fluid conducting means for regulating fluid flow between said wheel brake cylinders and said pressure fluid supply reservoir;

third electromagnetic valve means in said third fluid conducting means for regulating fluid flow between said first and said second working chambers of said master brake cylinder and said pressure fluid supply reservoir;

and sensing means responsive to movement of said brake pedal for sensing the position of said brake pedal and for controlling:

(a) said third electromagnetic valve means to permit fluid flow between said first and said second working chambers of said master brake cylinder and said pressure fluid supply reservoir prior to the application of said brake pedal, (b) said first electromagnetic valve means to permit fluid flow between said first and said second working chambers of said master brake cylinder and said wheel brake cylinders when said brake pedal is applied and prior to slip control operation, (c) said pump means to regulate the delivery of fluid from said pressure fluid supply reservoir to said first and said second working chambers of said master brake cylinder during slip control operation, and (d) said pump means to regulate the delivery of fluid from said pressure fluid supply reservoir to said first and said second working chambers of said master brake cylinder when said brake pedal has moved a distance representative of inadequate pressure fluid in said wheel brake cylinders.

8. A hydraulic brake system according to claim 7 wherein said sensing means include:

(a) a first switch for sensing the position of said brake pedal prior to movement of said brake pedal to permit fluid flow between said first and said second working chambers of said master brake cylinder and said pressure fluid supply reservoir prior to the application of said brake pedal, (b) a second switch for sensing movement of said brake pedal a prescribed first distance to regulate the delivery of fluid from said pressure fluid supply reservoir to said first and said second working chambers of said master brake cylinder during slip control operation, and (c) a third switch for sensing movement of said brake pedal a prescribed second distance which is greater than said prescribed first distance and representative of inadequate pressure fluid in said wheel brake cylinders to regulate the delivery of fluid form said pressure fluid supply reservoir to said first and said second working chambers of said master brake cylinder.

* * * * *